（12）United States Patent
Albero et al.

(10) Patent No.: US 11,089,141 B2
(45) Date of Patent: Aug. 10, 2021

(54) METHOD AND SYSTEM FOR DATA PRIORITIZATION COMMUNICATION

(71) Applicant: Bank of America Corporation, Charlotte, NC (US)

(72) Inventors: George Albero, Charlotte, NC (US); Elijah Clark, Charlotte, NC (US); Elizabeth Swanzy-Parker, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/736,934

(22) Filed: Jan. 8, 2020

(65) Prior Publication Data

US 2021/0211527 A1 Jul. 8, 2021

(51) Int. Cl.
*G06F 15/173* (2006.01)
*H04L 29/08* (2006.01)
*H04L 5/00* (2006.01)

(52) U.S. Cl.
CPC .......... *H04L 69/329* (2013.01); *H04L 5/0044* (2013.01); *H04L 29/08072* (2013.01); *H04L 29/08981* (2013.01); *H04L 67/1097* (2013.01); *H04L 67/327* (2013.01)

(58) Field of Classification Search
USPC ....................................................... 709/223
See application file for complete search history.

(56) References Cited

U.S. PATENT DOCUMENTS

| 6,327,578 | B1 | 12/2001 | Linehan | |
|---|---|---|---|---|
| 6,628,654 | B1* | 9/2003 | Albert | H04L 12/4633 370/389 |
| 7,331,049 | B1* | 2/2008 | Jin | G06Q 10/107 709/201 |
| 7,370,336 | B2* | 5/2008 | Husain | H04L 41/0803 719/328 |
| 7,599,888 | B2 | 10/2009 | Manfre et al. | |
| 7,856,399 | B2 | 12/2010 | Wilkes | |
| 8,280,809 | B2 | 10/2012 | Wilkes | |
| 8,407,798 | B1* | 3/2013 | Lotem | G06F 21/577 726/25 |
| 9,965,749 | B2 | 5/2018 | Rafferty et al. | |
| 10,643,423 | B2* | 5/2020 | Lyons | G07F 17/3211 |

(Continued)

*Primary Examiner* — Anthony Mejia
(74) *Attorney, Agent, or Firm* — Banner & Witcoff, Ltd.; Michael A. Springs

(57) ABSTRACT

Methods, systems, and computing platforms for data communication are disclosed. The processor(s) may be configured to electronically receive a first digital record data payload including a first originating node attribute, a flash code identifier attribute and at least one data element associated with a computer readable record. The processor(s) may be configured to electronically receive a second digital record data payload including a second originating node attribute, and at least one data element associated with a computer readable record. The processor(s) may be configured to electronically process the first digital record data payload and the second digital record data payload to determine which of the first digital record data payload or the second digital record data payload includes the flash code identifier attribute to determine a designation network location.

11 Claims, 10 Drawing Sheets

(56) References Cited

U.S. PATENT DOCUMENTS

| | | | |
|---|---|---|---|
| 2002/0120763 A1* | 8/2002 | Miloushev | H04L 67/1008 |
| | | | 709/230 |
| 2003/0115141 A1 | 6/2003 | Felix et al. | |
| 2004/0024700 A1 | 2/2004 | Petigny | |
| 2004/0177037 A1 | 9/2004 | Lee | |
| 2004/0236692 A1 | 11/2004 | Sellen et al. | |
| 2005/0182719 A1 | 8/2005 | Withrow | |
| 2005/0265241 A1* | 12/2005 | Makowski | H04L 43/08 |
| | | | 370/241 |
| 2007/0165625 A1* | 7/2007 | Eisner | G06Q 20/223 |
| | | | 370/389 |
| 2007/0276956 A1* | 11/2007 | Dorai | H04L 67/2819 |
| | | | 709/238 |
| 2009/0150605 A1* | 6/2009 | Flynn | G06F 12/0246 |
| | | | 711/112 |
| 2011/0161681 A1* | 6/2011 | Dhuse | G06F 11/1443 |
| | | | 713/193 |
| 2012/0016728 A1 | 1/2012 | Ahmad et al. | |
| 2012/0099589 A1* | 4/2012 | Kato | H04L 63/10 |
| | | | 370/389 |
| 2012/0317032 A1 | 12/2012 | Wilkes | |
| 2014/0286342 A1* | 9/2014 | Xia | H04L 45/38 |
| | | | 370/392 |
| 2016/0308729 A1* | 10/2016 | Choi | H04L 41/14 |
| 2017/0171610 A1* | 6/2017 | Nair | H04N 21/23476 |
| 2018/0091420 A1* | 3/2018 | Drake | H04L 45/38 |
| 2019/0037586 A1* | 1/2019 | Park | H04L 1/0057 |
| 2020/0167477 A1* | 5/2020 | Ionescu | G06F 16/907 |
| 2020/0233754 A1* | 7/2020 | Spurlock | H04L 63/30 |

\* cited by examiner

METHOD AND SYSTEM FOR DATA PRIORITIZATION COMMUNICATION

FIELD OF THE DISCLOSURE

The present disclosure relates to methods, systems, and computing platforms for data communication.

BACKGROUND

Moore's law predicted that the number of transistors on a computer chip would double every two years while the chip's price would remain constant. "Moore's law" meant consumers could buy better technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data.

Technology and digital infrastructure are woven into the fabric of our everyday lives. More than just smartphones or personal computer, operations technology is the infrastructure that purifies water, supplies power, heat and cooling, runs the supply chain that supports consumers. Cyberattacks reports of both attempted and successful digital attacks on critical infrastructure, both in the government and private sector are increasing. There have been reports of isolated cases of targeted systems being impacted. Nonetheless, functionality in these systems could be degraded by cyberattacks that cause system wide damage to government networks and others. There is a need to respond with a technological solution.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure relates to a system configured for data communication. The system may include one or more hardware processors configured by machine-readable instructions. The processor(s) may be configured to electronically receive a first digital record data payload including a first originating node attribute, a flash code identifier attribute and at least one data element associated with a computer readable record. The processor(s) may be configured to electronically receive a second digital record data payload including a second originating node attribute, and at least one data element associated with a computer readable record. The processor(s) may be configured to electronically process the first digital record data payload and the second digital record data payload to determine which of the first digital record data payload or the second digital record data payload includes the flash code identifier attribute to determine a designation network location. The processor(s) may be configured to electronically transmit the first digital record data payload associated with the flash code identifier attribute to the designation network location, while disallowing transmitting of the second digital record data payload.

In some implementations of the system and method, the processor(s) may be configured to process the first digital record data payload with a prioritization index data element. In some implementations of the system and method, the processor(s) may be configured to electronically process the first digital record data payload and the second digital record data payload to determine which of the first digital record data payload or the second digital record data payload includes the flash code identifier attribute and the prioritization index data element to determine the designation network location. In some implementations of the system and method, the processor(s) may be configured to create a virtual data payload associated with the computer readable record of the first digital record data payload. In some implementations of the system and method, the processor(s) may be configured to electronically process the first digital record data payload includes responsive to a threshold value of the prioritization data element, proceed to transmit the first digital record data payload to the designation network location. In some implementations of the system and method, the processor(s) may be configured to electronically process the first digital record data payload includes sampling a value of the prioritization data element responsive the value being lower than a predetermined threshold value of the prioritization data element, disallowing transmission of the first digital record data payload to the designation network location.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various implementations, reference is made to the accompanying drawings, which form a part hereof, and in which is shown by way of illustration, various implementations in which the disclosure may be practiced. It is to be understood that other implementations may be utilized and structural and functional modifications may be made.

Figure 1:
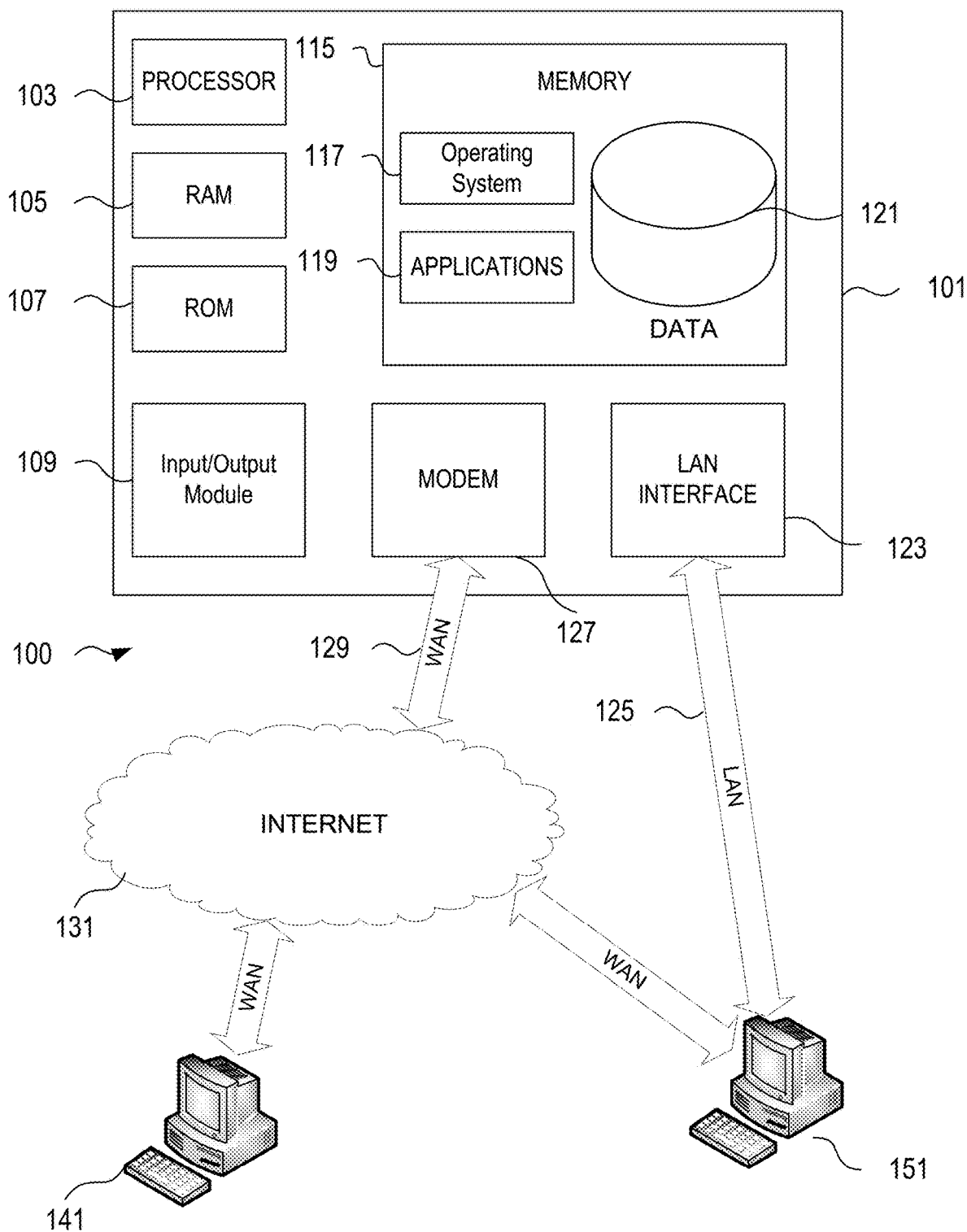
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations and may use ORACLE, TERADATA, NETEZZA software.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
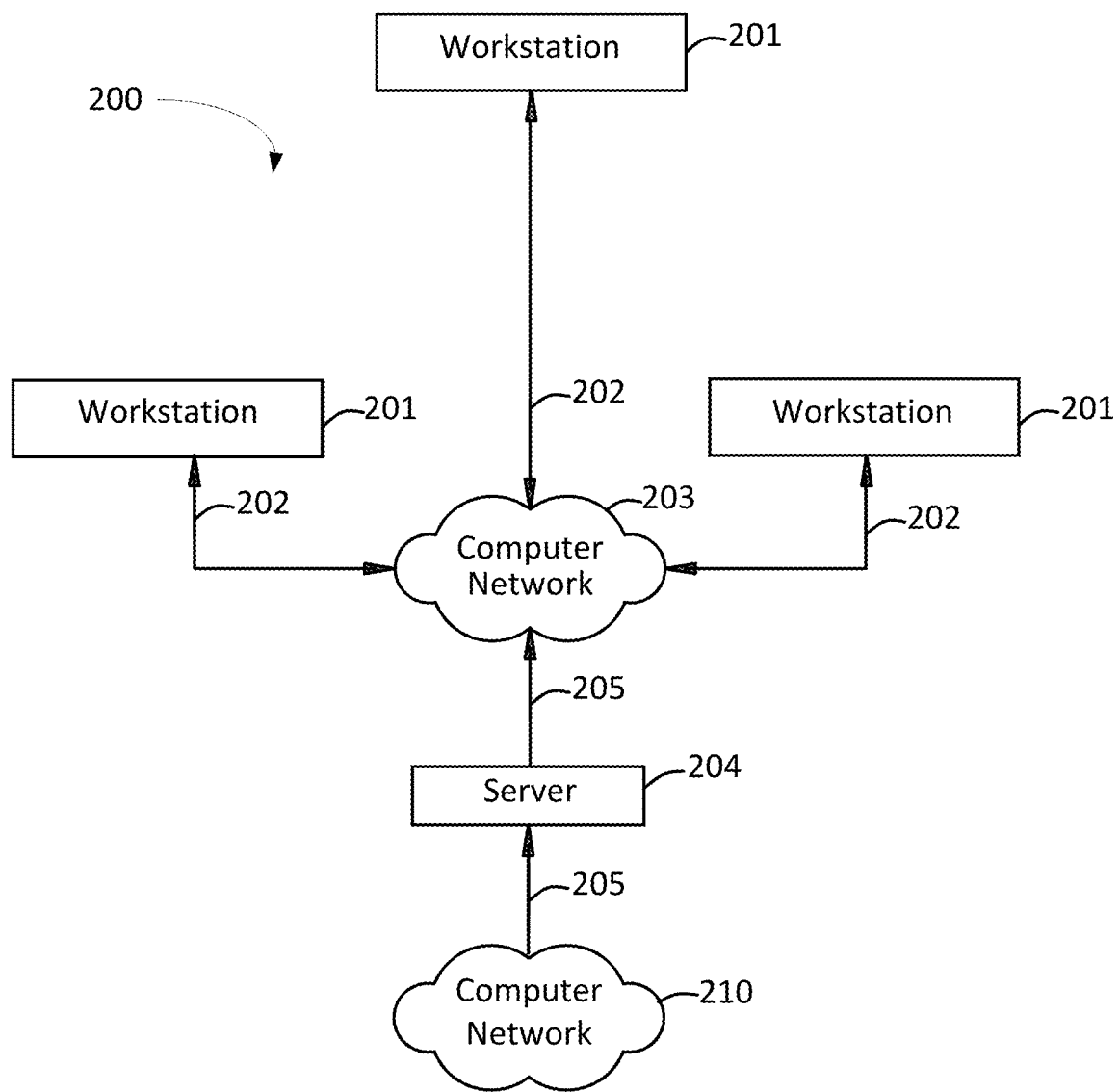
FIG. 2 is an illustrative block diagram of workstations and servers that may be used to implement the processes and functions of certain implementations of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3A:
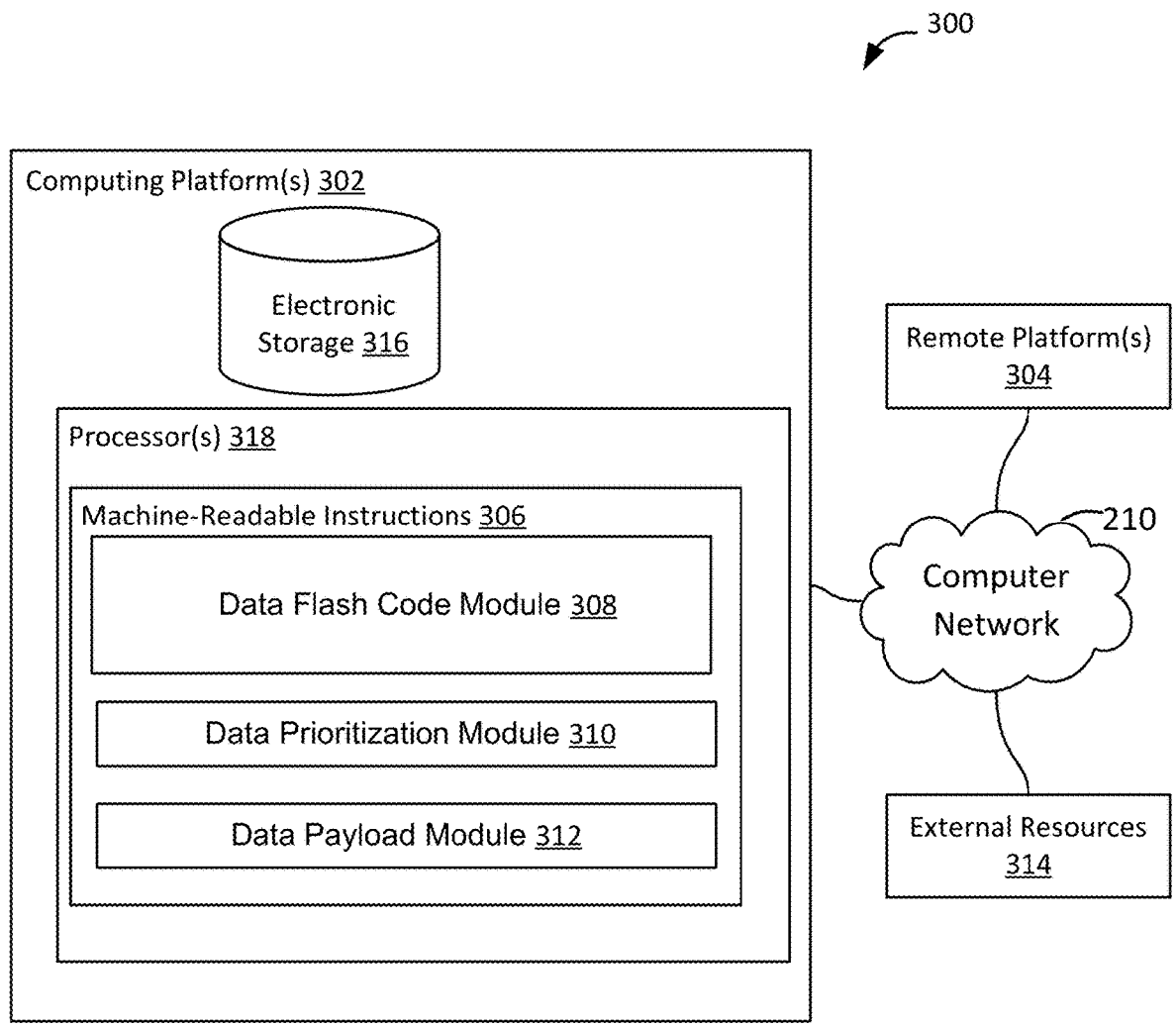
FIG. 3A illustrates a system configured for data communication, in accordance with one or more implementations.

FIG. 3A illustrates a system 300 configured for data communication, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of flash code identifier module 308, prioritization module 310, data payload module 312, and/or other instruction modules.

The modules 308, 310, 312 and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

Figure 3B:
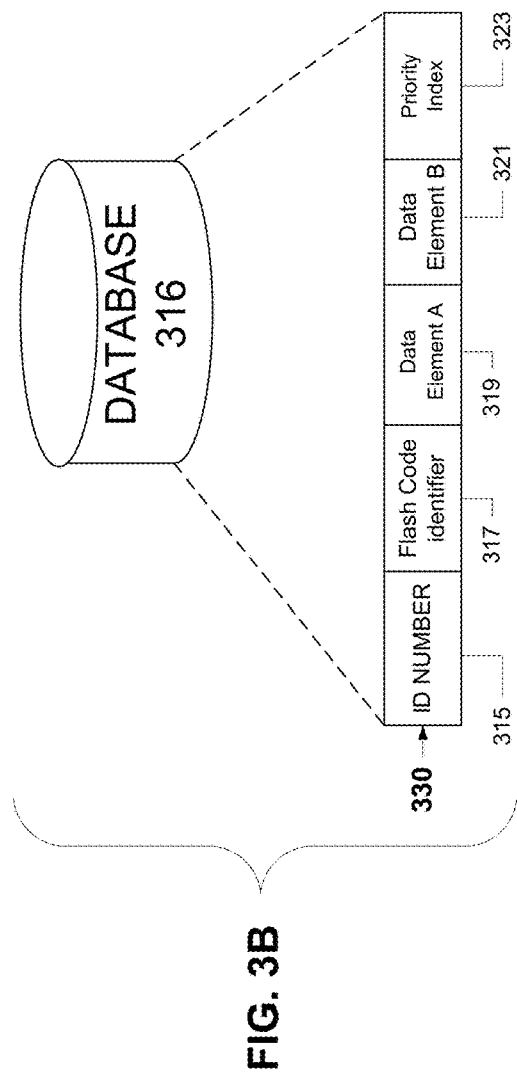
FIG. 3B is an illustrative functional block diagram of a database data set with an injected Flash Code Identifier Data Element and Prioritization Index Data Element that may be used to implement the processes and functions in one or more implementations.
Figure 3C:
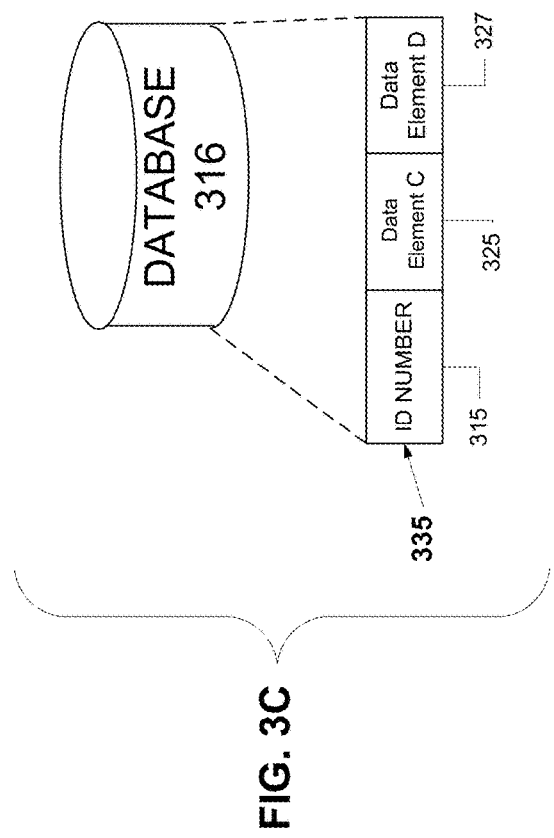
FIG. 3C is an illustrative functional block diagram of a database data set that may be used to implement the processes and functions in one or more implementations.
Figure 6:
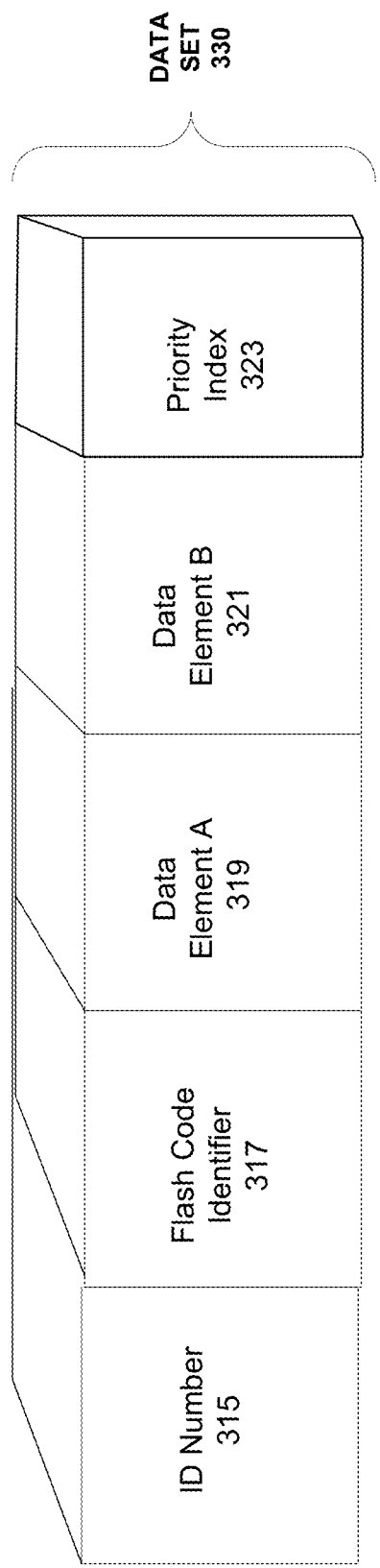
FIG. 6 is an example block diagram of an illustrative digital data set in accordance in accordance with one or more implementations.

According to some aspects of the disclosure in FIGS. 3A-3C, the system 300 provides electronic messaging back and forth that inputs requests for selective network location from data set 330 or data set 335. The network 203, 210 can be used for sending data using OSI Open Systems Interconnection (OSI) model, including the transport layer (OSI layer 4). Protocols, such as TCP/IP, may be utilized for transport of data. Referring to FIGS. 3A-3C, in one aspect, system 300 may use various attribute data, for example, in Electronic Data Interchange (EDI) format. In one implementation of module 312, the EDI message can use, for example, IPSEC circuitry for secure encrypted communications or other encrypted protocols. The EDI messages can be electronically processed according any number of formats and data sequences. In one case, the digital record data set 330 EDI format and payload, may include an ID number 315, a flash code identifier data element 317, a data element A attribute 319, a data element B attribute 321, and a prioritization index data element 323 (see FIG. 6).

Module 308 provides processing for the Flash Code Identifier (FCI) data element 317. FCI data element 317 pertains precedence data traffic such as electronic stored valued transactions and halting all others without the FCI data element 327. The system 300 in conjunction with data switch 900 can halt all other electronic transfers between non top-tier entities, by closing the circuits, until the appropriate network control center authorities provide the clearance to re-open.

Module 310 provides for processing of Prioritization Index data element 323. Prioritization Index data element 323 pertains to various levels of when data can be sent through the networks. For example, prioritization index 323 may be a numerical spectrum for indication of a predetermined level of priority of the data set. In still one example, a numerical ranking of 4 being high priority; a numerical ranking of 3 being moderate priority, a numerical ranking of 2 being low priority and a numerical ranking of 1 being no priority. In one way, the (FCI) data element 317 may be considered an injectable data super priority tag to allow this data to reach its intended designation network. In the EDI format and payload, the computer readable database 316 may include the "attribute data" including ASCII characters in computer readable form or binary complied data. The ASCII characters or binary data can be manipulated in the software of system 300.

Figure 8:
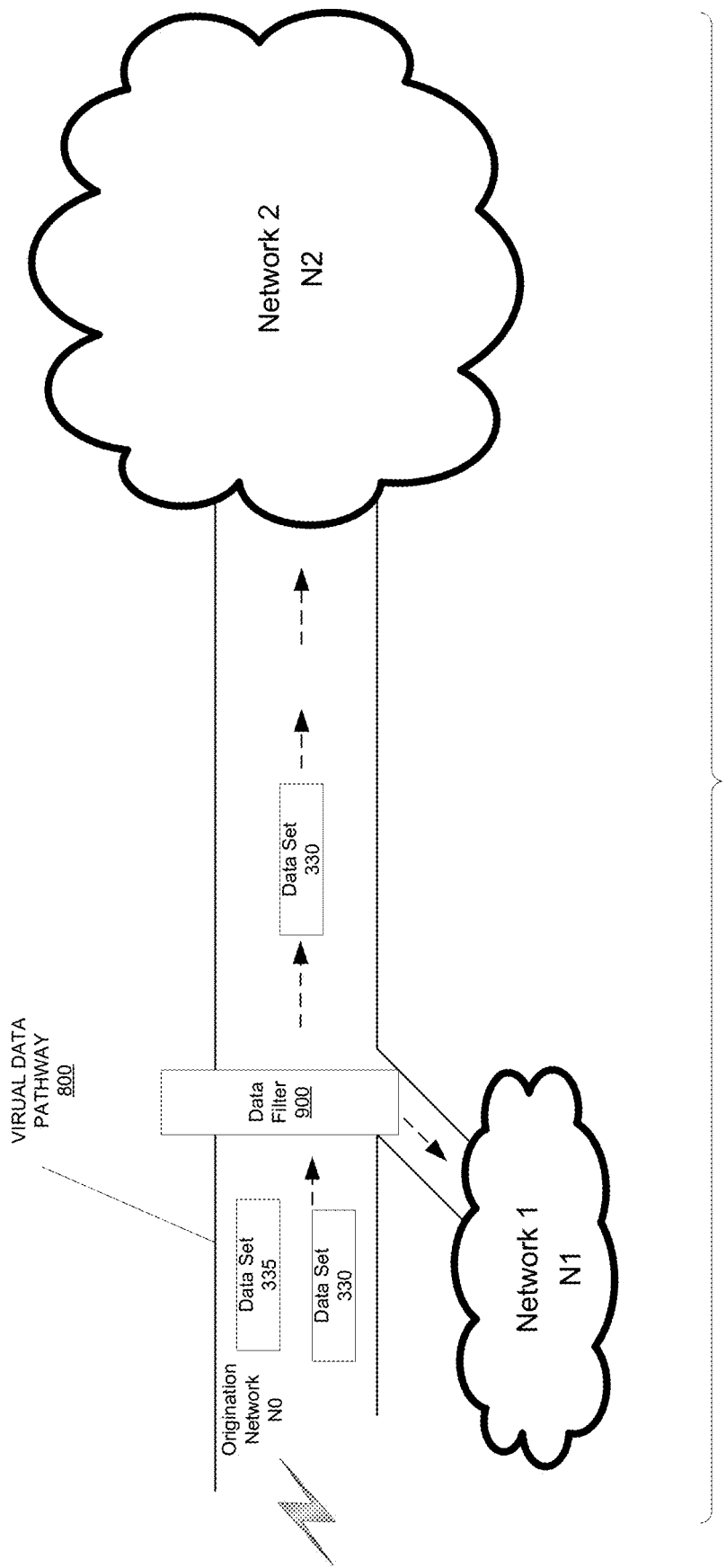
FIG. 8 is an example block diagram of an illustrative network and dynamic data switch in accordance with at least one aspect of the present disclosure.
Figure 9:
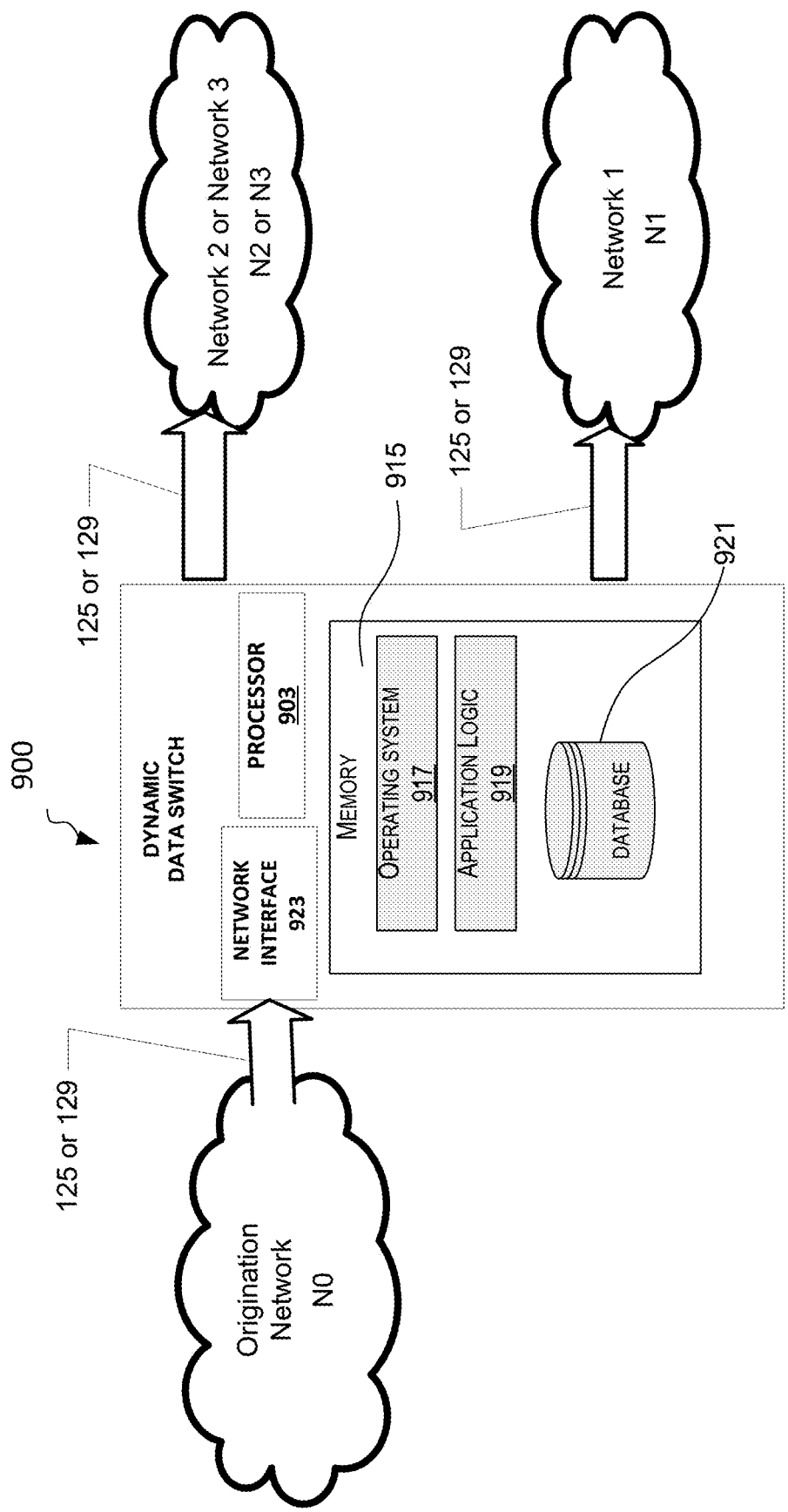
FIG. 9 is an illustrative block diagram of dynamic data switch that may be used to implement the processes and functions of one or more implementations.

Referring to FIGS. 8 and 9, a dynamic data switch 900 may include Application Logic 919 that decodes the received data set 330 and data set 335 and samples the payload data from it. The dynamic data switch 900 may be placed at strategic locations in a virtual data pathway 800 in an Originating Network NO as shown in FIG. 8. Dynamic data switch 900 includes a processor 903 for controlling overall operation of the switch and its associated components, including memory 915 and Application logic 919. Dynamic data switch 900 may include a network interface or adapter 923. It should be appreciated that the network connections 125, 129 shown are illustrative and other means of establishing a communications link between the computers may be used. Further, the virtual data pathway 900 may include an IPSEC circuit. Memory 915 may store software used by the switch 900, such as an operating system 917, and an associated database 921. The data switch 900 could be part of a data router or a standalone system. Using the Application logic 919, the data can be extracted from the data stream, such as portions of digital record data set 330 (e.g., FCI 317, or a data element A attribute 319 or a data element B attribute 321). The payload data may include data elements, for example, a data element A attribute 319, and a data element B attribute 321 that can be any appropriate data element pertaining to electronic data records stored for a user or patron and a prioritization index 323 may include a priority ranking indication as discussed in the foregoing.

Memory 915 of dynamic data filter switch 900 may be engaged by the Application logic 919, to include operating instructions stored in a non-transitory computer readable memory/database, as well as for storing status information, such as virtual copy of the sampled/extracted data, such as portions of data set 330. The Application logic 919 provides for a computer implement method for the sampling of the data stream (See FIG. 8 for data filer switch 900). In particular, the memory 915 may be used for storing software or other instructions that are executed by the Application logic 919 to achieve the functionality described herein, in which one implementation the memory 915 may be considered a program storage device. Memory 915 may further store operating system software 917 for controlling overall operation of the device 900. Nevertheless, the program operating instructions of Application logic 919 can be stored in non-transitory computer readable database 921.

Figure 7:
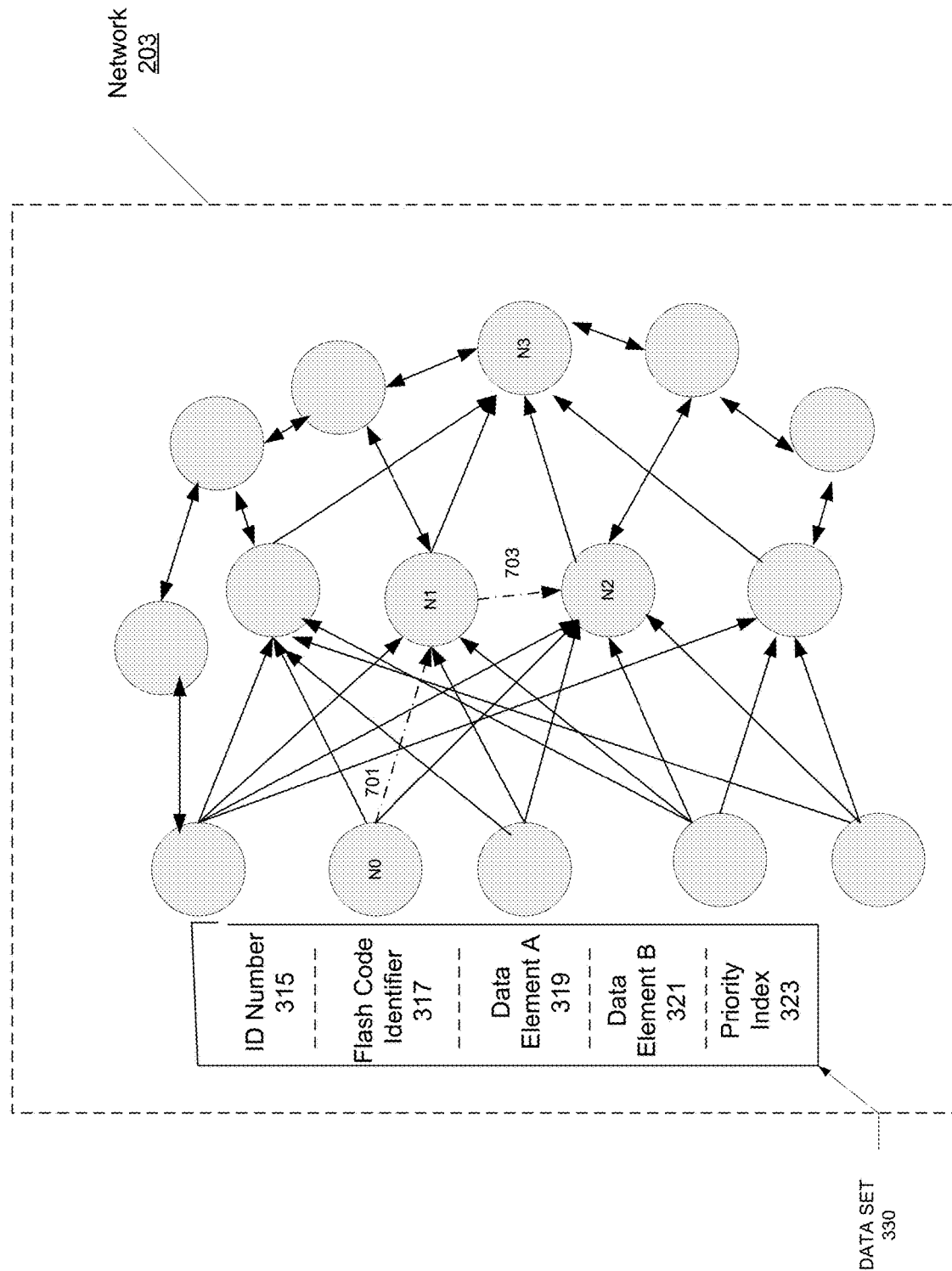
FIG. 7 is an illustrative block diagram of a network with data that may be used to implement the processes and functions of one or more implementations.

Still referring to FIGS. 7 and 8, data set 330 can be extracted or sampled from the data stream. In one implementation, the Application logic 919 could sample a data element, such as FCI 317 and the prioritization index attribute 323. In one implementation, responsive to a threshold value of the prioritization attribute 323, the data set 330 with FCI 317 may be then be allowed to proceed to the designation network N1, N2 and N3 based upon the various scoring factors, such as the prioritization index level and type of data records. For instances, a threshold value of the prioritization index attribute 323 could be greater than 2 ranking (based on an index spectrum of 1-4).

Referring to FIGS. 3A-3C, and 7-9, in one implementation, the module 310 and application logic 919 may include receiving a data payload including an originating node attribute 315, a prioritization index attribute 323 and at least one data element 319, 321 associated with a computer readable record 330. In another step, application logic 919 may include electronically sampling the data payload including the at least one data element 319, 321 and determining a value of the prioritization index attribute 323. In yet another implementation, module 308 and application logic 919 may include electronically processing injectable flash code identifier attribute 317 into the data payload. In a further step, application logic 919 may include electronically routing the digital record data payload including the originating node attribute, the flash code identifier attribute 317 and the at least one data element associated.

Module 312 provides for processing of the data set 330 or 335. The indication of degraded designation network or a degraded network data path can be provided on a computer readable storage of database 316. This creates a virtual flash network for further analysis with a network control center or other cybersecurity function for rerouting the data set with switch 900 away for those identified degraded designation network or a degraded network data path. In the example of FIG. 7, potentially degraded networks N1, N2 and pathways 701, 703 may be of interest for further analysis. Pathway 701 pertains between Originating Network NO and Network N1. Pathway 703 pertains to Network N1 and Network N2. Once a FCI is provided on the data set 330, the system 300 may be reroute the data from NO to another network (avoiding N1 and N2) path to designation network N3.

The steps that follow and can be implemented to include a computer readable transaction history or log of the status within process flows that can be maintained or otherwise stored within a memory/database, such as memory 115 and/or RAM 105 in FIG. 1 or electronic database 316 of FIGS. 3A-3C. Regarding the construction with digital record data set 330, a data element A attribute 319, and a data element B attribute data 321 can be any appropriate data element pertaining to electronic data records stored for a user or patron or entity, including a pecuniary entity. In one example, data element A attribute 319, data element B 321 attribute can be associated with a data of a user profile or transaction history for physical products. Alternatively, data element A 319, data element B 321 can be associated with a data of transactions transfer of electronic store of values. The system 300 may then employ selective attribute data in the Electronic Data Interchange (EDI) format to form a tokenized/container data form for data transfer.

In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable an expert or user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3A is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 316 may comprise non-transitory storage media that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3A as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, and/or 312, and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

Figure 4:
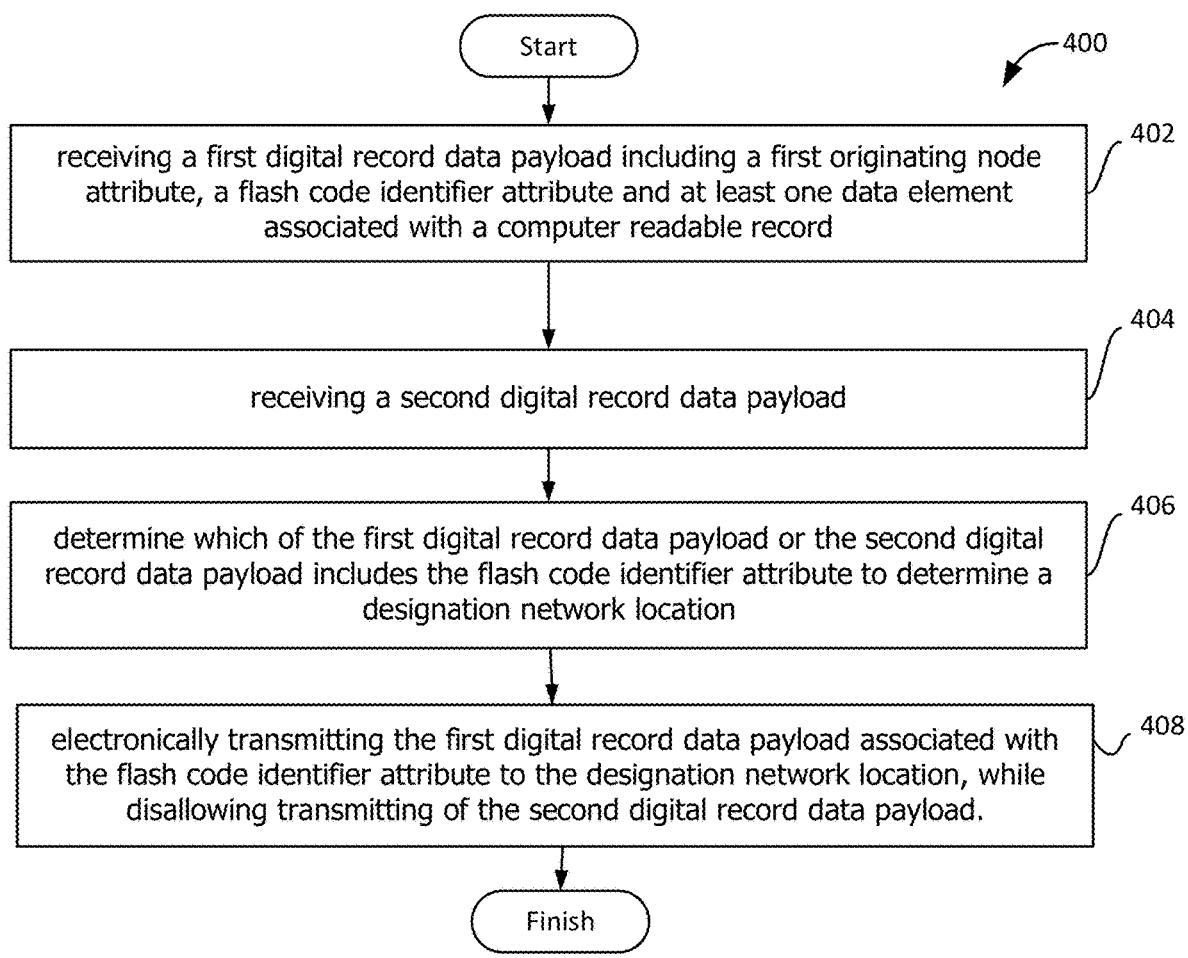
FIG. 4 illustrates a method for data communication, in accordance with one or more implementations.
Figure 5:
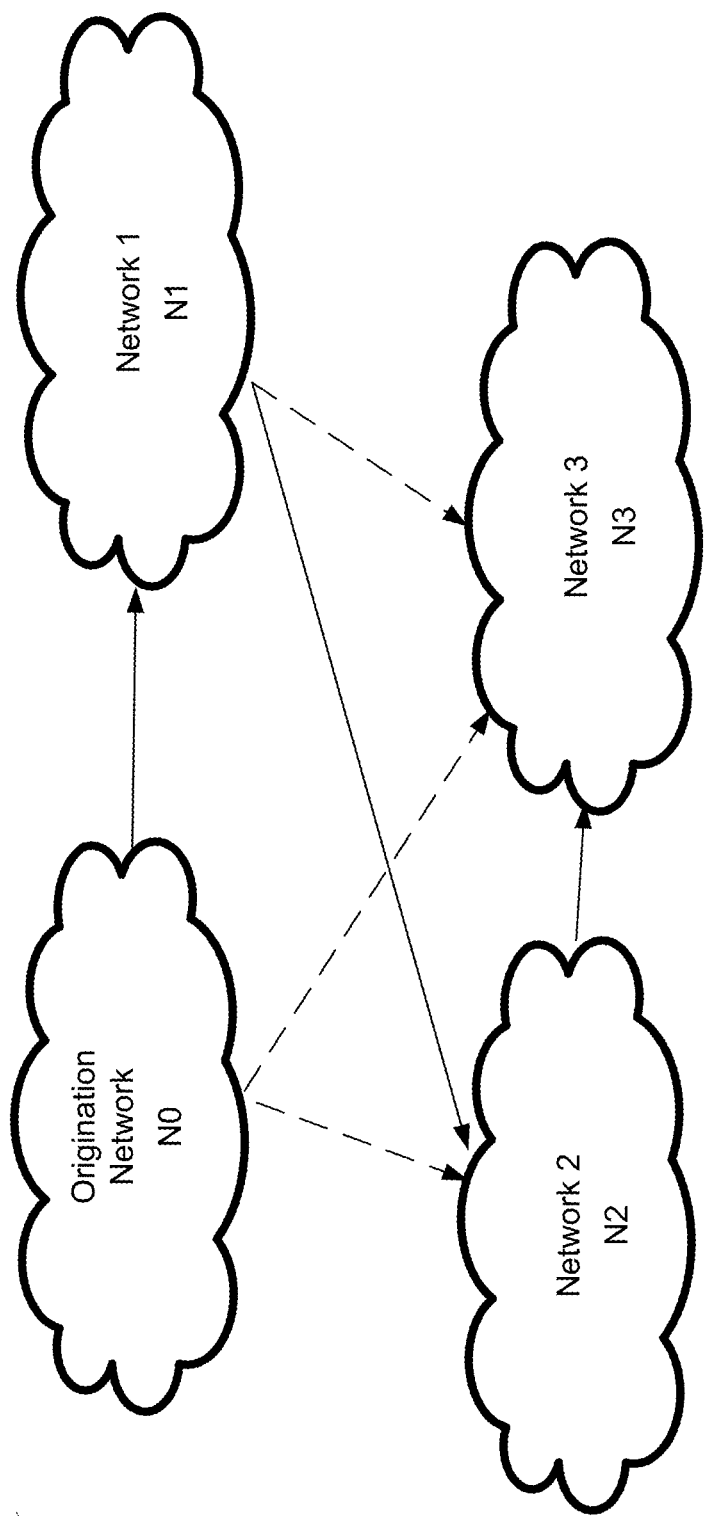
FIG. 5 is an example block diagrams of data communication networks of an illustrative method in accordance with one or more implementations.

It should be appreciated that although modules 308, 310, and/or 312, are illustrated in FIG. 3A as being implemented within a single processing unit, in implementations in which processor(s) 318 includes multiple processing units, one or more of modules 308, 310, and/or 312, may be implemented remotely from the other modules. The description of the functionality provided by the different modules 308, 310, and/or 312, described below is for illustrative purposes, and is not intended to be limiting, as any of modules 308, 310, and/or 312, may provide more or less functionality than is described. For example, one or more of modules 308, 310, and/or 312, may be eliminated, and some or all of its functionality may be provided by other ones of modules 308, 310, and/or 312. As another example, processor(s) 318 may be configured to execute one or more additional modules that may perform some or all of the functionality attributed below to one of modules 308, 310, and/or 312, FIG. 4 illustrate a method 400 for data processing, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4, and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4 illustrates method 400, in accordance with one or more implementations. An operation 402 may include electronically receiving a first digital record data 330 payload including a first originating node attribute 315, a flash code identifier attribute 317 and at least one data element 319, 312 associated with a computer readable record. Operation 402 may be performed by one or more hardware processors configured by machine-readable instructions including module that is the same as or similar to modules 308 and 310 in accordance with one or more implementations.

An operation 404 may include electronically receiving a second digital record data 335 payload including a second originating node attribute 315, and at least one data element 325, 327 associated with a computer readable record. Operation 404 may be performed by one or more hardware processors configured by machine-readable instructions including a module that is the same as or similar to module 312, in accordance with one or more implementations.

An operation 406 may include electronically processing the first digital record data 330 payload and the second digital record data 335 payload to determine which of the first digital record data payload 317 or the second digital record data 335 payload includes the flash code identifier attribute to determine a designation network location N1, N2, or N3. Operation 406 may be performed by one or more hardware processors configured by machine-readable instructions including a module that is the same as or similar to module 312, in accordance with one or more implementations.

An operation 408 may include electronically transmitting the first digital record data 330 payload associated with the flash code identifier attribute to the designation network location, while disallowing transmitting of the second digital record data 335 payload or forwarding the second digital record data 335 payload to an alternative network, such as Network N1 (see FIG. 8). Operation 408 may be performed by one or more hardware processors configured by machine-readable instructions including a module that is the same as or similar to data payload module 312, in accordance with one or more implementations.

In some implementations of the present disclosure of technology with system 300, in the event of a natural disaster, incident or cyber-attack which may severely degrade the functionality of various network systems, prioritization of significant data communication can take precedence over others. In one scenario, wholesale electronic data outflows to and from top-tier pecuniary repositories can take precedence and over retail pecuniary data outflows via the degraded infrastructure. Nevertheless, there are other implementations of practical application of the technology discussed herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An electronic computer implemented method of data communication, comprising:

electronically receiving a first digital record data payload including a first originating node attribute, a flash code identifier attribute and at least one data element associated with a computer readable record;

electronically receiving a second digital record data payload including a second originating node attribute, and at least one data element associated with a computer readable record;

electronically sampling the first digital record data payload and the second digital record data payload to determine which of the first digital record data payload or the second digital record data payload includes the flash code identifier attribute to determine a designation network location; and electronically transmitting the first digital record data payload associated with the flash code identifier attribute to the designation network location, while disallowing transmitting of the second digital record data payload; wherein the first digital record data payload further comprises a prioritization index data element;

electronically processing the first digital record data payload and the second digital record data payload to determine which of the first digital record data payload or the second digital record data payload includes the flash code identifier attribute and the prioritization index data element to determine the designation network location; and electronically processing the first digital record data payload includes sampling a value of the prioritization index data element responsive the value being lower than a predetermined threshold value of the prioritization index data element, disallowing transmission of the first digital record data payload to the designation network location.

2. The method of claim 1, further comprising creating a virtual data payload associated with the computer readable record of the first digital record data payload.

3. The method of claim 1, further comprising electronically processing the first digital record data payload includes responsive to a threshold value of the prioritization index data element, proceed to transmit the first digital record data payload to the designation network location.

4. A system configured for data communication, the system comprising:
one or more hardware processors configured by machine-readable instructions to:
electronically receive a first digital record data payload including a first originating node attribute, a flash code identifier attribute and at least one data element associated with a computer readable record;
electronically receive a second digital record data payload including a second originating node attribute, and at least one data element associated with a computer readable record;
electronically sample the first digital record data payload and the second digital record data payload to determine which of the first digital record data payload or the second digital record data payload includes the flash code identifier attribute to determine a designation network location; and
electronically transmit the first digital record data payload associated with the flash code identifier attribute to the designation network location, while disallowing transmitting of the second digital record data payload; wherein the first digital record data payload further comprises a prioritization index data element;
electronically process the first digital record data payload includes sampling a value of the prioritization index data element, and responsive the value being lower than a predetermined threshold value of the prioritization data element, disallowing transmission of the first digital record data payload to the designation network location.

5. The system of claim 4, wherein the first digital record data payload further comprises a prioritization index data element.

6. The system of claim 5, wherein the one or more hardware processors are configured by machine-readable instructions to further comprise electronically processing the first digital record data payload and the second digital record data payload to determine which of the first digital record data payload or the second digital record data payload includes the flash code identifier attribute and the prioritization index data element to determine the designation network location.

7. The system of claim 5, wherein the one or more hardware processors are configured by machine-readable instructions to further comprise creating a virtual data payload associated with the computer readable record of the first digital record data payload.

8. The system of claim 5, wherein the one or more hardware processors are configured by machine-readable instructions to further comprise electronically processing the first digital record data payload includes responsive to a threshold value of the prioritization index data element, proceed to transmit the first digital record data payload to the designation network location.

9. A computing platform configured for data communication, the computing platform comprising:
a non-transient computer-readable storage medium having executable instructions embodied thereon; and
one or more hardware processors configured to execute the instructions to: electronically receive a first digital record data payload including a first originating node attribute, a flash code identifier attribute and at least one data element associated with a computer readable record;
electronically receive a second digital record data payload including a second originating node attribute, and at least one data element associated with a computer readable record;
electronically sample the first digital record data payload and the second digital record data payload to determine which of the first digital record data payload or the second digital record data payload includes the flash code identifier attribute to determine a designation network location; and
electronically transmit the first digital record data payload associated with the flash code identifier attribute to the designation network location, while disallowing transmitting of the second digital record data payload wherein the one or more hardware processors are configured by machine-readable instructions to further comprise the first digital record data payload further comprises a prioritization index data element;
wherein the one or more hardware processors are configured by machine-readable instructions to further comprise electronically process the first digital record data payload includes sampling a value of the prioritization data element, and responsive the value being lower than a predetermined threshold value of the prioritization index data element, disallowing transmission of the first digital record data payload to the designation network location.

10. The computing platform of claim 9, wherein the one or more hardware processors are configured by machine-readable instructions to further comprise electronically processing the first digital record data payload and the second digital record data payload to determine which of the first digital record data payload or the second digital record data payload includes the flash code identifier attribute and the prioritization index data element to determine the designation network location.

11. The computing platform of claim 9, wherein the one or more hardware processors are configured by machine-readable instructions to further comprise electronically processing the first digital record data payload includes responsive to a threshold value of the prioritization index data element, proceed to transmit the first digital record data payload to the designation network location.

* * * * *